UNITED STATES PATENT OFFICE.

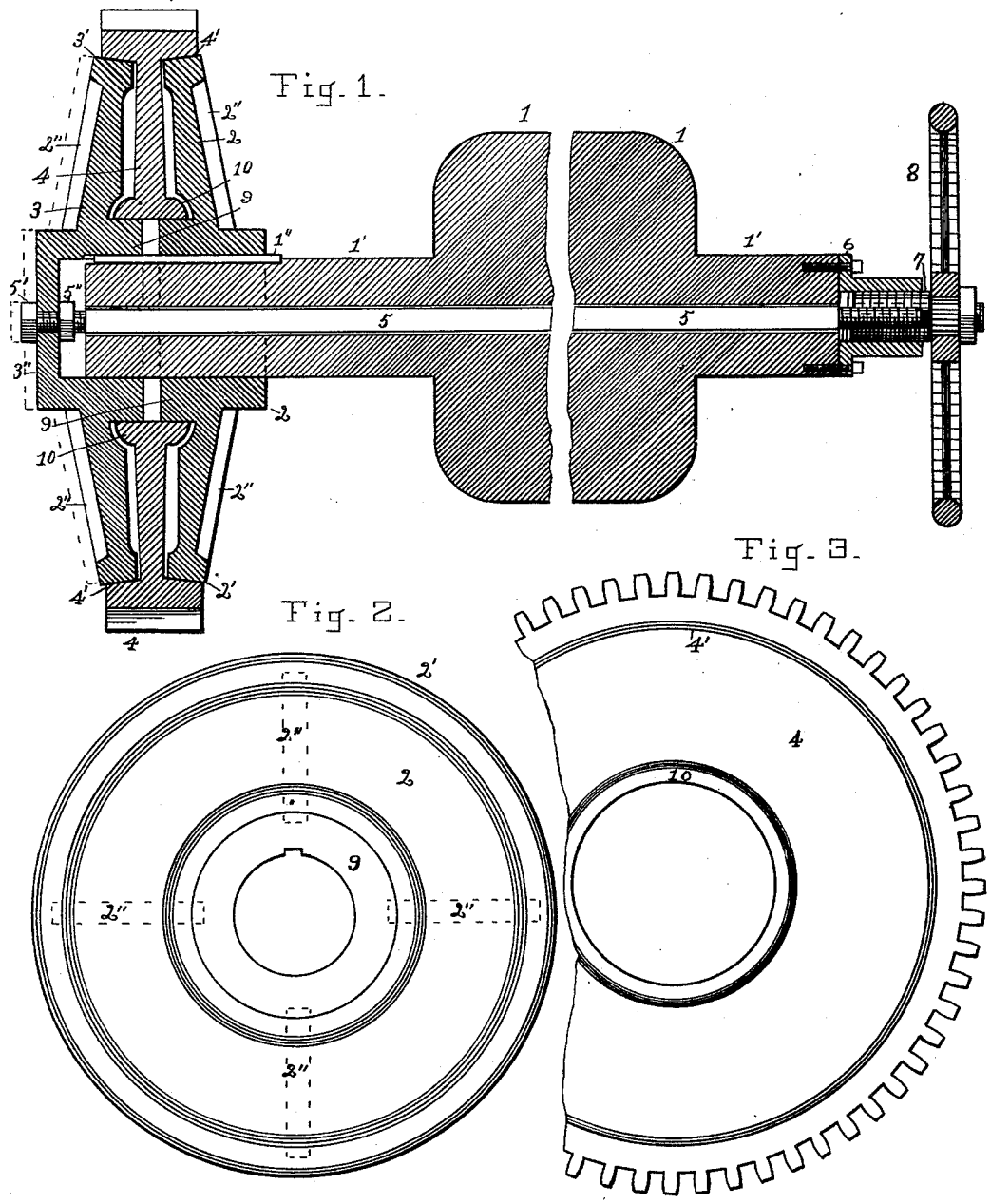

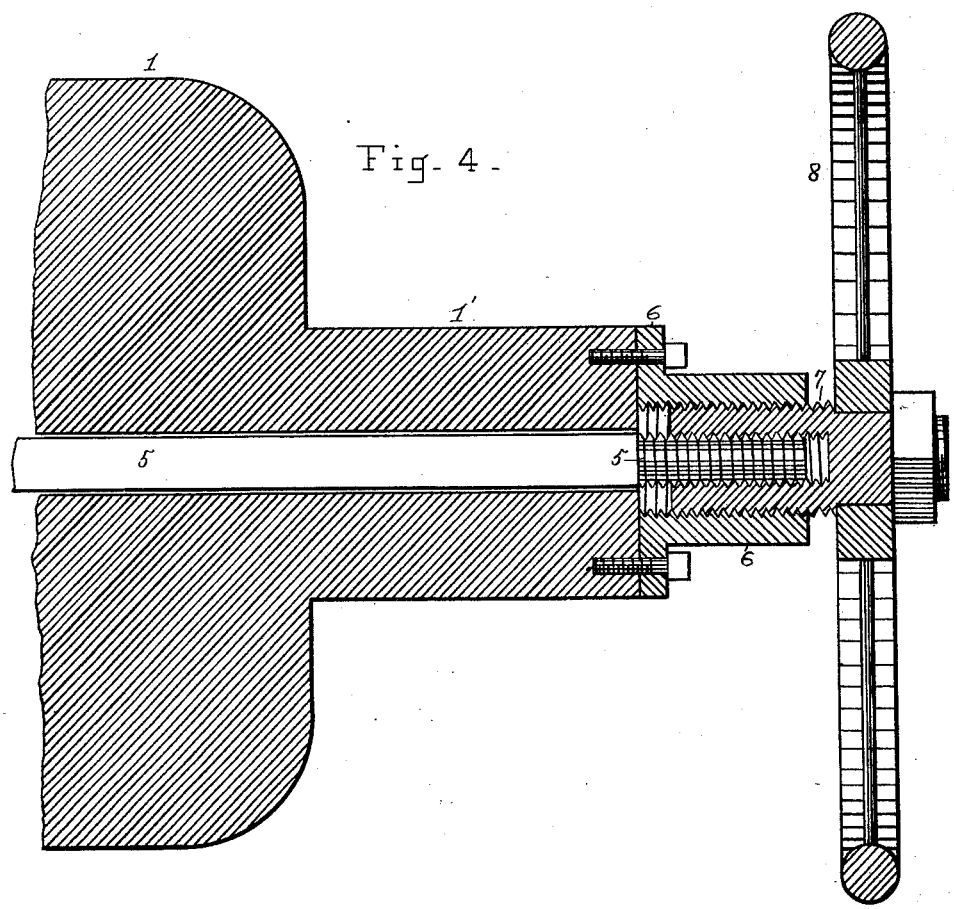

JOHN C. YOUNG AND GEORGE A. DAVIS, OF NEENAH, WISCONSIN.

FRICTION-CLUTCH.

SPECIFICATION forming part of Letters Patent No. 414,273, dated November 5, 1889.

Application filed August 2, 1889. Serial No. 319,582. (No model.)

*To all whom it may concern:*

Be it known that we, JOHN C. YOUNG and GEORGE A. DAVIS, citizens of the United States, residing at Neenah, in the county of Winnebago and State of Wisconsin, have invented a new and useful Improvement in Friction-Clutches, of which the following is a specification.

Our invention relates to improvements in friction-clutches which are applicable to pulleys and gears in the various devices to which they may be applied; and our invention is particularly desirable upon the calender and press rolls of paper machinery, upon one of the rolls of which it is here represented, but is equally as well adapted for use upon many other mechanical devices; and the object of our improvement is to simplify the construction and to produce a clutch that is adapted for application to heavy machinery, to be thrown into operation without a sudden shock to the machinery, and to retain said operating position without a liability of being loosened therefrom. We attain these objects by the mechanism illustrated in the accompanying drawings, in which—

Figure 1 is a vertical section of the several parts composing the clutch and a device for putting it into and out of its working position, and showing them as applied upon a calender-roll of a paper-machine. Fig. 2 is a plan of the inside of the fixed or right-hand flange of Fig. 1, the loose or left-hand one being like unto it, except as hereinafter described; Fig. 3, a plan of the power-transmitting portion, (a part being broken away,) and which, as before mentioned, may be a pulley or a gear, the latter being shown in this illustration; and Fig. 4 is a detail sectional view, upon an enlarged scale, of the clutch-operating mechanism—the parts 5, 6, 7, and 8 at the right-hand end of Fig. 1—and showing the manner of their connection with the roll 1 and with the clutch upon the left-hand end of said roll.

Similar figures of reference indicate like parts in the several views.

1 is the calender roll or shaft, upon one end of which the clutch is mounted; 1', the journal thereof; 2, a flange secured outside of said journal near the end of the roll and revoluble therewith; 3, a flange of similar size and outward form, revoluble with but having a longitudinal movement upon the roll; 2'', strengthening-ribs upon the exterior of the flanges 2 and 3, their position upon the flanges being indicated by the dotted lines in Fig. 2; 4, a gear-wheel located between the flanges 2 and 3; 5, a rod running longitudinally through the calender-roll and being connected at its left-hand end with the flange 3; 6, a flange bolted upon the end of the calender-roll opposite to that upon which the clutch is applied, and which is threaded internally; 7, a thimble threaded externally and engaging with the aforesaid internally-threaded flange, and also internally and engaging with the end of the rod 5; 8, a hand-wheel connected with the thimble, and by means of which said thimble is revolved and the rod and flange moved longitudinally.

The flanges 2 and 3, as before mentioned, are of similar form, the difference in their structure consisting in that, while the bore of the flange 2 extends through it, that of the flange 3 is closed by the cap 3'' for the purpose of receiving the rod 5, said rod being secured therein by the nut 5' and nut or fixed collar 5'', one being upon each side of said cap, and thereby connecting the rod and flange to each other.

The flange 2 is firmly keyed to the roll near its end by the key 1'', said key extending through the flange 2 and into the flange 3, fitting loosely in a seat formed in its bore, whereby the latter flange is permitted longitudinal movement upon the end of the roll, but is made to revolve with it by reason of the key. Upon the inner side of the flanges 2 and 3 are circular ribs 9, which are turned off for receiving the bore of the hub 10 of the gear-wheel 4, and upon which ribs or projecting portion of the flanges the gear-wheel is adapted to be revolved. Rings 4' or internal beveled surfaces are formed upon each side of the gear-wheel, adapted to be engaged by the peripheries 2' and 3' of the flanges 2 and 3, whose surfaces are correspondingly beveled. The angle of these bevels may be such as are best adapted for the particular use to which the clutch is to be applied.

The gear-wheel 4 may be revolved by means of a gear upon a parallel shaft meshing with it, (but, being no part of our present invention, is not shown in the drawings,) and which may be driven from any available motor. When the flanges 2 and 3 are drawn toward each other with sufficient force, their beveled peripheries press upon the corresponding surfaces of the gear-wheel, which causes them and the calender-roll or other shaft to which they may be attached to be revolved. Upon reversing the direction of the above-named pressure by moving the flange 3 outward or toward the left, as indicated by its outline in the dotted lines of Fig. 1, the gear-wheel is released from the pressure of the flanges and is permitted to revolve freely upon the circular ribs 9 and the calender-roll to cease its revolutions.

The means which we prefer for effecting the longitudinal movement of the flange 3 for the purpose of putting the calender-roll into and out of operation consists of the thimble 7, externally and internally threaded, one being a right-hand and the other a left-hand thread, and engaging with the flange 6 and rod 5. The turning of the hand-wheel 8 operates the screw-threads upon the rod 5, flange 6, and thimble 7, moving the rod longitudinally, and with it the flange 3, and thereby engaging and disengaging the friction-surfaces of the flanges and gear-wheel and putting the calender-roll into or out of operation, as desired.

The thimble 7 may be, if preferred, threaded only upon its interior to engage with the threads upon the rod 5, it being arranged to revolve within the flange 6 and prevented from longitudinal movement therein. With this arrangement and the same number of threads in both cases an increased number of revolutions of the hand-wheel will be required in the latter case for the engagement and disengagement of the clutch mechanism.

Having described our invention, what we claim, and desire to secure by Letters Patent, is—

1. In a friction-clutch, the combination of the following elements: a shaft, two flanges arranged thereon, one being secured to and revoluble with said shaft, the other revoluble with but permitted a longitudinal movement thereon, each flange having a beveled circumference or their periphery at a slight angle with the line of their bore, and also having upon their inner side a circular rib, a wheel arranged between said flanges and adapted to be revolved upon said ribs, a beveled ring upon each side of said wheel adapted to engage the beveled circumference of the flanges aforesaid and to revolve said flanges by frictional contact therewith, a rod extending through the center of the shaft aforesaid, one end thereof being connected with the longitudinally-movable flange aforesaid and the other having means for its movement longitudinally, whereby the aforesaid flange may be thrown into and out of contact with the wheel aforesaid, and the clutch thereby made operative or inoperative, substantially as described.

2. In a friction-clutch, the combination of the following elements: a shaft, two flanges arranged thereon, one being secured to and revoluble with said shaft, the other revoluble with but permitted a longitudinal movement thereon, each flange having a beveled circumference or their periphery at a slight angle with the line of their bore, and also having upon their inner side a circular rib, a wheel arranged between said flanges and adapted to be revolved upon said ribs, a beveled ring upon each side of said wheel adapted to engage the beveled circumference of the flanges aforesaid and to revolve said flanges by frictional contact therewith, a rod extending through the center of the aforesaid shaft, one end thereof being connected with the aforesaid longitudinally-movable flange and the other being threaded and provided with an internally and externally threaded thimble working thereon, a flange secured to the shaft aforesaid adapted to and receiving said thimble, and means for the revolution of the thimble by the operator, whereby the aforesaid longitudinally-movable flange may be thrown into and out of contact with the wheel aforesaid, and the clutch thereby made operative or inoperative, substantially as described.

JOHN C. YOUNG.
GEO. A. DAVIS.

Witnesses:
  F. A. LEAVENS,
  JNO. P. SHIELLS.